United States Patent [19]

Nguyen Huu et al.

[11] 4,151,597
[45] Apr. 24, 1979

[54] MICROPROGRAMMABLE CONTROL UNIT

[75] Inventors: Duyet Nguyen Huu; Jean-Claude Ballegeer; Richard Guedj, all of Paris, France

[73] Assignee: Thomson-CSF, Paris, France

[21] Appl. No.: 817,014

[22] Filed: Jul. 19, 1977

[30] Foreign Application Priority Data

Jul. 23, 1976 [FR] France .................. 76 22623

[51] Int. Cl.² ..................................... G06F 9/18
[52] U.S. Cl. ............................. 364/900; 364/200
[58] Field of Search ..... 364/200 MS file, 900 MS file

[56] References Cited

U.S. PATENT DOCUMENTS

| 3,689,895 | 9/1972 | Kijamura | 364/200 |
| 3,972,029 | 7/1976 | Bailey, Jr. | 364/200 |

Primary Examiner—Mark E. Nusbaum
Assistant Examiner—C. T. Bartz

Attorney, Agent, or Firm—Cushman, Darby & Cushman

[57] ABSTRACT

A microprogrammable control unit to be associated with a memory in which there have been pre-recorded two sequences of micro-instructions relating to two faces (digital systems) to be coupled and to outside resources adapted to emit control signals necessary for these two digital systems is provided. The control unit comprises at least an addressing unit for the memory adapted to the quasi-simultaneous operation of the two sequences, internal resources comprising at least for each face an input register, an output register of data and a counter and common to the two faces a multiplexer of the signals indicating the states of the internal resources and of the external resources, instruction registers for memorizing codes furnished by the microinstruction extracted from the memory and a transcoding device controlling the resources, the addressing unit and the multiplexer as a function of the codes of microinstructions with which data are associated.

7 Claims, 6 Drawing Figures

| Source | Dest. | IN | 170 |
|---|---|---|---|
| Ext<br>IEX=1 | 140(A.B) |  | 4 - |
| | Reg Ext |  | 8 - |
| | | X | 8 - 3 |
| | 1Reg BR |  | 5 - |
| | | X | 5 - 3 |
| | 2Reg BR |  | 5 - 6 |
| | | X | 5 - 6 - 3 |
| | 150(A-B) |  | 1(A) - 2(B) |
| 130(A-B)<br>IEX=0 | 140(A-B) |  | 4 |
| | Reg Ext |  | 8 |
| | | X | 8 - 3 |
| | 1Reg BR |  | 5 |
| | | X | 5 - 3 |
| | 2Reg BR |  | 5 - 6 |
| | | X | 5 - 6 - 3 |
| | INDEX |  | 7 |

Fig. 6

MICROPROGRAMMABLE CONTROL UNIT

BACKGROUND OF THE INVENTION

1. Field of the Invention

The present invention relates to logic systems to be connected between two digital systems capable of exchanging items of information so as to provide a coupling of such logic systems, taking into account the characteristics of the signals liable to be exchanged and the chronology proper to each one of the digital systems and their relative chronology.

2. Description of the Prior Art

Interface logic circuits achieving for example the coupling between a computer and a peripheral (such as a printer, a control unit of a flexible disc or the like) are known in the prior art.

These logic circuits, designed case by case by solving the problems of coupling between the different elements of a processing system, are commonly designated by the term "couplers".

Independently of the adaptation of the levels of the electric signals liable to be exchanged, which adaptation does not come within the scope of the present invention, the general functions of such a coupler may be:
  conversions of the formats of the exchanged data;
  the checkings carried out of these data;
  the control of the duration of the data signals and the control signals so that they are in accordance with the requirements of duration imposed by the system which must receive them.

To carry out these functions, the coupler must be capable of processing a disparate collection of exchange signals. It will consequently have to have available "resources" which enable it to recognize an electric level, to reply to a demand, to emit a demand, to detect signal transitions, to measure a duration, or to calibrate a waveform. Generally, these different types of processings are effected by different adapted circuits connecting the outputs of one of the digital systems to the corresponding inputs of the other, the assembly of these circuits forming the coupler.

Presently known couplers do not integrate all of the functions mentioned hereinbefore in the same circuit.

SUMMARY OF THE INVENTION

An object of the present invention is to provide a microprogrammable control unit capable of constituting the central unit of programmable interface circuits in which there is centralized the processing of the signals exchanged between the digital systems to be coupled and in which the processing of the demands of each one of the two systems to be coupled is effected in real time; such a control unit is capable of operating in an independent manner or capable of following a central digital system.

The control unit according to the invention is constructed around an addressing device of a microprogrammed memory such as that described in the French patent application No. 76.18 599 filed on June 18, 1976, which device furnishes, as a function of the data and the controls presented at its input, two sequences of microprogramm addresses and the associated state signals, these addresses being available at the outputs of the addressing unit at a fixed rhythm and concerning alternately one and the other of the two microprogram sequences; these two sequences relate to each of two digital systems to be coupled.

According to the invention, there is provided a microprogrammable control unit for an interface circuit, said control unit comprising an addressing device to select at a fixed rhythm micro-instructions alternatively taken in one and the other of two sequences of micro-instructions respectively relating to two digital systems to couple, said two sequences being stored in a memory and each of said micro-instructions comprising a code word to direct the operation of the control unit during the following addressing in the same sequence, instruction-registers to store different fields of said code words of said micro-instructions, internal resources comprising for each face at least an input register to receive data from outside said control unit, an output register to emit data outside said control unit and an up-down counter to receive starting data modified by successive incrementations under the control of said code word, said control unit further comprising a multiplexer receiving state indicating signals coming from said internal resources and from outside said control unit, said multiplexer being controlled by a field of said code word and delivering a test signal applied to said addressing device, said test signal being used by said addressing unit for a further addressing in a sequence when the following address depends on a condition relating to the state signal considered.

BRIEF DESCRIPTION OF THE DRAWINGS

For a better understanding of the invention and to show how the same may be carried into effect, reference will be made to the following description and the attached drawings among which:

FIG. 6 is an explanatory table of the different types of micro-instructions capable of being employed for the programming of the operation of the control unit.

DESCRIPTION OF THE PREFERRED EMBODIMENTS

The microprogrammable control unit according to the invention is adapted to constitute the central core of coupling systems in which will be centralized the processings of signals having logic levels.

In order to illustrate the types of functions which must be performed by said control unit and to show how such a unit is capable of being microprogrammed, an example of utilization of this unit associated with the necessary external circuits will be described with reference to FIG. 1.

Figure 2:
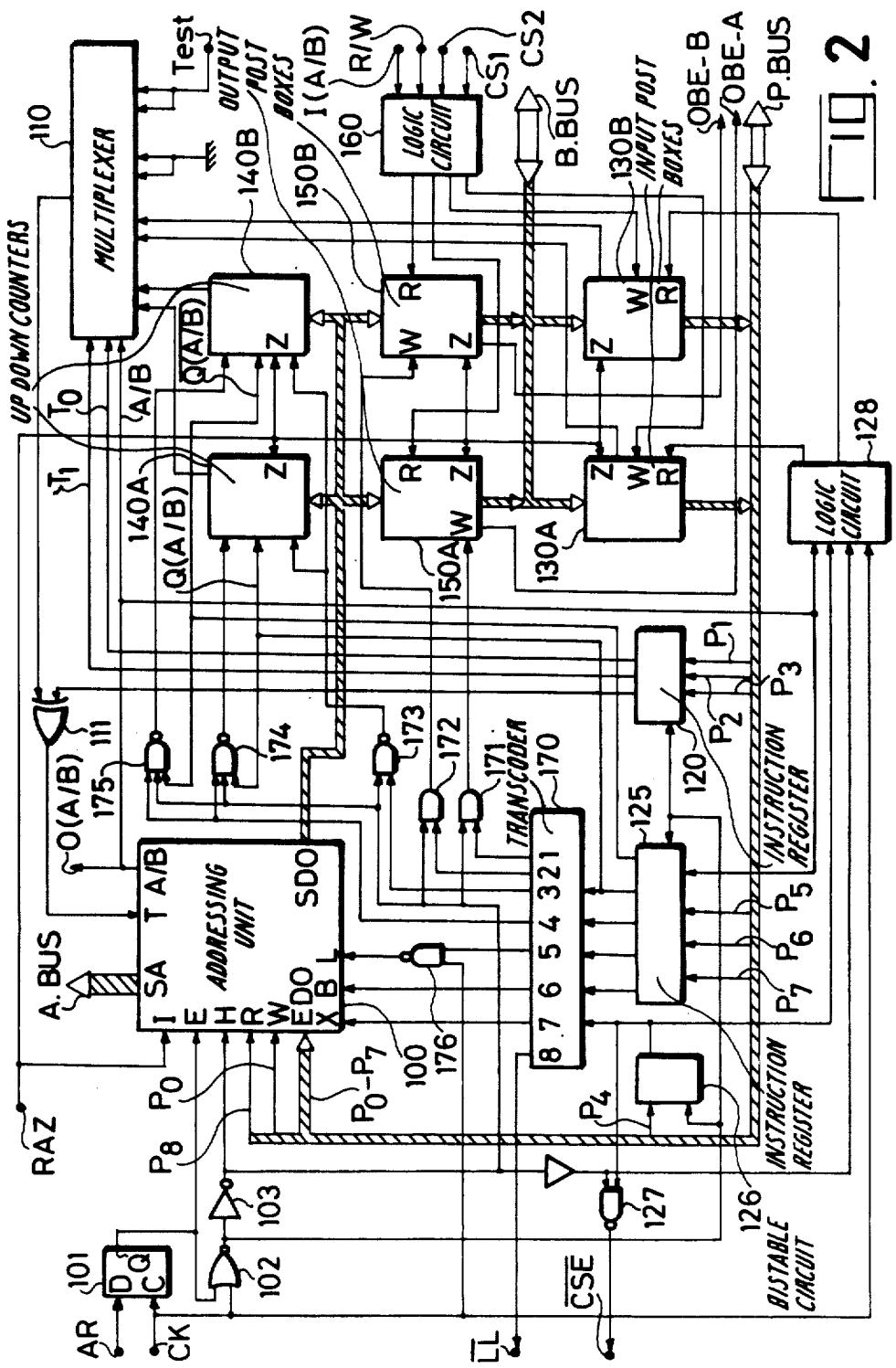
FIG. 2 represents a diagram of the microprogrammable control unit according to the invention.

This manner of approach will lead to a more precise description of the microprogrammable control unit and of its operation with reference to FIG. 2.

Figure 1:
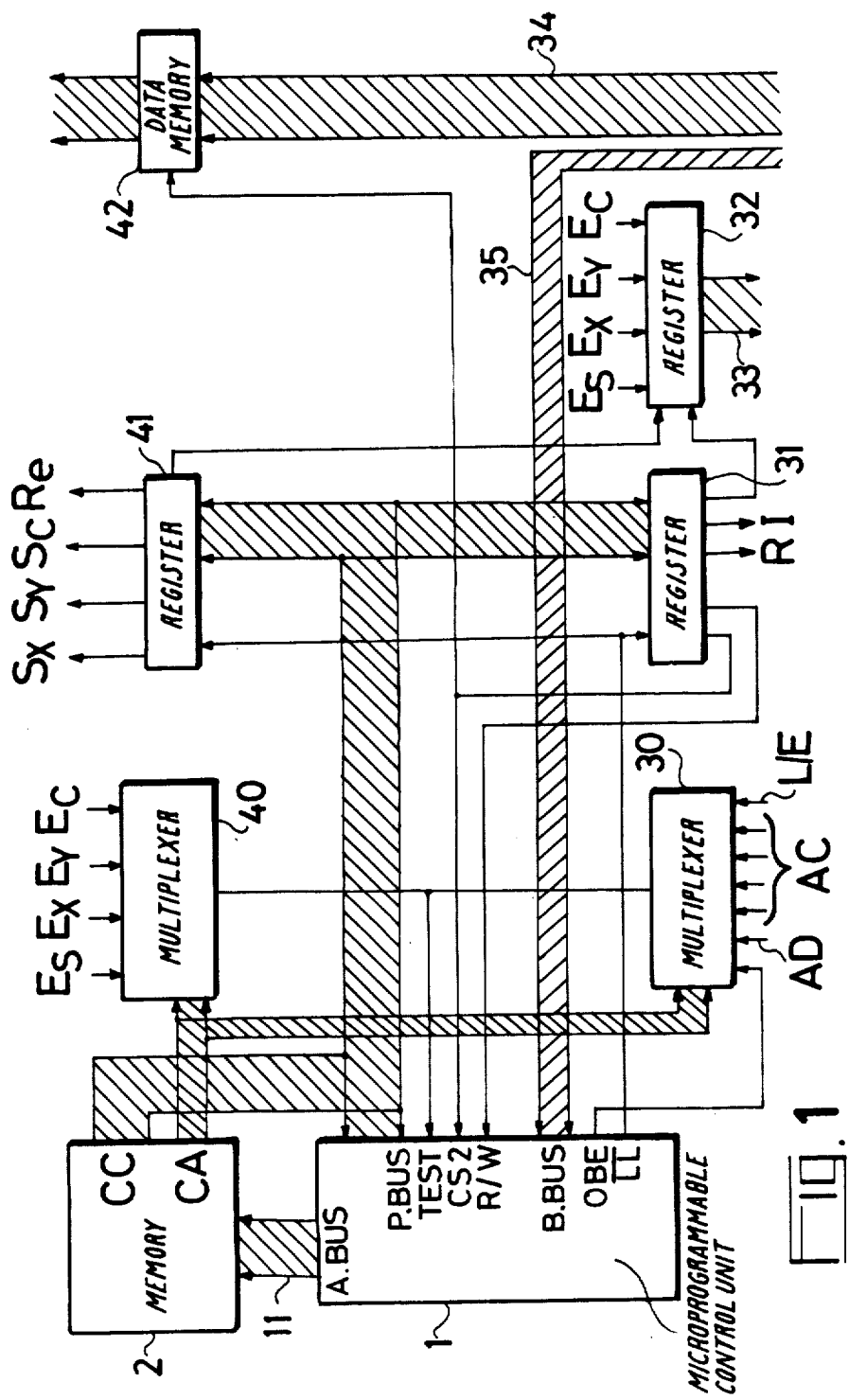
FIG. 1 is a diagram of an interface circuit between a computer and a printer comprising a control unit according to the invention and complementary resources.

FIG. 1 shows by way of example an interface circuit between on one hand a computer and on the other hand a printer constructed around a microprogrammable control unit. It has been supposed that the printer is capable of performing three functions:
  a displacement in a direction OX;
  a displacement in a direction OY;

the printing of a character (typing of a character in the last position (X, Y) received).

It is moreover supposed that these functions are controlled by a word of data which represents either the value of the displacement in X or Y and which then has 11 binary elements to which there is added a binary element corresponding to the sign of the displacement, or the code or the character to be printed and it then has 8 binary elements.

The choice between these three functions is effected by an initiating signal $S_X$, $S_Y$ or $S_C$ received by the printer, the latter signalling its position by means of state signals $E_X$, $E_Y$ and $E_C$. A supplementary state signal $E_S$ gives to the exterior an information of a defect of the printer. The functions may be chained in any order, the printing of a character always being effected at the last coordinates X and Y received. The printer may also receive a signal $R_e$ which commands the return of the carriage to a fixed point.

As concerns the computer, it is supposed that it directly emits in the code understood by the printer the data word utilizable by the printer.

For the selection of the peripheral, the computer emits an address signal AD, the active state of which is the low level and four complementary addressing binary elements AC, the peripheral being effectively selected when the address signal AD is active and when the four address binary elements correspond to the number assigned to the peripheral through the medium of the interface circuit. Moreover, the computer emits a signal L/E indicating in which direction the data are transferred, that is to say, if they are emitted by the computer or if it is in position for receiving them. As the same time as this addressing, the computer emits or reads a word of 16 bits. The transfer from a data word is terminated when the computer receives a response signal R which is sent thereto by the interface circuit. Lastly, the processing in course in the computer may be stopped by an interuption signal I transmitted thereto.

The interface circuit between the computer and the printer must therefore perform the following six functions:

control the reading by the computer of the state of the printer represented by the state signals $E_X$, $E_Y$, $E_C$ and $E_S$;

put itself into the position of rest in which it will be ready to take into account the signals emitted by the computer;

control the typing by the printer of a character by emitting a signal $S_C$ and simultaneously sending to the computer an interruption order I;

control the displacement of the carriage of the printer in the direction X by sending a signal $S_X$ to the printer and simultaneously sending to the computer an interruption signal I;

the same function as the preceding function, but for the displacement of the carriage in the direction Y;

initiating the printer by emitting the signal Re.

The interface circuit shown in FIG. 1 comprises for this purpose a microprogammable control unit 1 which supplies, at its multiple output 11, to a memory 2 the address of the micro-instruction to take from the memory for generating control and test signals for producing the coupling between the first face, which is here the computer side, and the second face which is here the printer.

External resources are assigned to the computer face and other external resources are assigned to the printer face.

In respect to the computer face, these resources are a multiplexer 30 which receives the address signals from the computer AD and AC (4 binary elements), the signal L/E indicating in which direction the data are transferred, and a state signal from an "OBE" output of the microprogrammable control unit which warns that a resource internal with respect to the control unit, termed output post box hereinafter, has changed state.

The multiplexer is commanded by a field CA of the micro-instruction furnished by the memory 2, this field indicating the address of the multiplexer to be taken into account. If the address field present on the control lines corresponds to the address of the multiplexer 30, the latter emits a signal, termed test signal, which is a function of the state signals present at the inputs of the multiplexer. This test signal is applied to the test input of the microprogrammable control unit 1.

In the same way, the resources relating to the printing face comprises a multiplexer 40 which receives the state signals $E_X$, $E_Y$, $E_C$ and $E_S$ on one hand, the address field of the micro-instruction furnished by the memory 2 on the other hand, and delivers at its output a test signal which is a function of the state signals applied to its inputs when the address field corresponds to the address of the multiplexer 40. This test signal is also applied to the test input of the microprogrammable control unit 1.

The interface circuit further comprises the resources necessary for emitting the command signals relating to the computer on one hand and to the printer on the other.

The register 31 furnishes directly to the computer, as a function of the data present at its inputs, the response signal R indicating that the transfer of a data word is terminated or the interruption signal I for stopping the processing in course in the computer. It moreover emits a reading or writing control signal applied to an input R/W of the control unit indicating in which direction the data must be transferred and a selection signal applied to an input CS2 of the control unit on one hand and to the selection input of a data memory register 42 on the other hand, this register being adapted to receive data from the computer directly. As the connection between the computer and the memory register is unidirectional, this register is always intended for a writing operation. The control unit comprises input post boxes and output post boxes which are registers respectively for the transfer of data from the exterior to the control unit (writing operation) and for the transfer of data from the control unit to the exterior (reading operation), these two types of operation being controlled by the two states of the signal R/W after validation of the selection signal CS2. The emission register 31 also emits a control signal for transferring the state signals of the printer stored in a register 32 to a connection 33 intended for the computer.

The data necessary for the control of this emission register 31, are, on one hand, a field of the microinstruction CC furnished by the memory 2 upon each step of advance of the microprogram, on the other hand, a signal $\overline{LL}$ which, when it is at an active level (assumed to be low), allows the generation of the external control signals.

The emission register 41 relating to the printing face furnished one of the control signals $S_X$, $S_Y$, $S_C$, Re or possibly a signal for storing state signals $E_X$, $E_Y$, $E_C$, and $E_S$ according to the field CC of the micro-instruction furnished by the memory 2 and the control signal $\overline{LL}$ also applied to an input of the emission register 41. The register 32 for storing the state signals $E_X$, $E_Y$, $E_C$ and $E_S$ furnished by the printer and for furnishing them directly, at instants determined by the control signal issuing from the emission register 31, receives the storing signal issuing from the emission register 41. After the performing of one of the functions by the interface circuit and the printer, this circuit responds to the computer then in the reading position by systematically sending to the computer the state word contained in the register 32 for the reading. The computer emits data which are the value of the displacement in X or Y or the code of the character to be printed; these data are transmitted to the printer through a multiple connection of data 34 applied to the data memory register 42. The computer also emits a certain number of binary elements, corresponding to the coding of an order, which are transmitted to the control unit 1 through a multiple connection 35 and applied to the multiple input B-BUS of this control unit. The orders transmitted to the control unit by the computer correspond to one of the six possible functions to be performed by the interface circuit. The interpretation of this code by the control unit produces either a direct transfer of data from the computer to the printer or the search in the memory 2 of a micro-instruction which produces the control signals necessary for performing one of these 6 functions.

In the transmission of the different signals, the interface circuit must take into account what is understood to be termed requirements of operation. For example, for performing one of the functions, the state signal $E_i$ ($E_X$, $E_Y$, or $E_C$) must be at rest, as also the overall state signal $E_S$, and a minimum duration t (for example 1 $\mu$s) must elapse between the return to rest of the state signal $E_i$ and the reception of the corresponding signal $S_i$.

The microprogrammable control unit therefore has several essential functions in most of the interface circuits:

acquire data for each face;
possibly modify these data as a function of time so as to effect a counting of duration;
search for and acquire micro-instructions for controlling the control unit;
test, whether the micro-instruction is conditional, the value of an indicator signal expressing this condition.

Lastly, as the control unit and, in a general way, the whole of the interface circuit is controlled by two sequences of microprograms recorded in the memory and respectively relating to the two faces to be coupled, must comprise an addressing device of this memory capable of effecting the two sequences quasi-simultaneously.

In relation to the foregoing, FIG. 2 represents a diagram of the structure of a microprogrammable control unit according to the invention. In this diagram, the references employed in FIG. 1 for designating the various outputs of the control unit will be the same. This circuit is intended to be employed in a general way in a large number of interface circuits. For this purpose, it must have a number of internal resources which is sufficient for couplings which are more complicated than that envisaged hereinbefore. Thus, there will be found in this control unit an input post box and an output post box for each face. In the preceding example, a single one of these post boxes (output) was used.

More precisely, the microprogrammable control unit according to the invention shown in FIG. 2 comprises an addressing unit 100 for a microprogrammed memory such as described in the aforementioned patent application.

It will be recalled that this device is adapted to ensure that two microprogram sequences are executed quasi-simultaneously by delivering alternately at its multiple output SA, at a fixed rhythm, an address relating to one and then the other of the two sequences. For this purpose, during one stage, and simultaneously, the device takes into account the data presented at its inputs necessary for the computing of an address relating to one face and it computes the following address of the sequence relating to the other face from the data acquired for this other face during a preceding stage. The output SA of the addressing unit is directly connected to the output A-BUS of the control unit. This output is connected to the addressing input of the memory in which the two micro-instruction sequences have been recorded. The addressing device comprises a multiple data input EDO and a multiple data output SDO. It further comprises an output A/B which delivers a synchronous signal of acquisition and computation relating to the two faces, an input T for the test to determine the addressing mode of the memory in combination with an input X. The addressing unit further comprises a clock input H which is the base clock of the system, an inhibition input I which permits to set to zero the output lines of the addressing unit, an input E which permits to bring these same lines to a high impedance for cancelling out the effect of these lines on all the external lines to which they have been connected. Lastly, the addressing unit comprises selection and control inputs for the writing and the reading of the different memory registers within the addressing unit.

The addressing of the memory may be either a sequential addressing or a branch addressing and in order to be able to execute a subprogram in each sequence, the device comprises at least two sequence registers and two branch registers for each face.

The memory delivers the binary elements of data and control, forming a micro-instruction, to the control unit through a multiple connection applied to the multiple input P-BUS of the control unit.

The control unit may also receive data through the multiple connection B-BUS and a test signal from the exterior through an input test. The control unit further comprises an input RAZ to set to zero the different elements of this unit, in particular the addressing unit, an input AR for maintaining this unit in a state of pause, and a clock input CK which receives the base clock signal of the unit. The stop signal AR and the clock signal CK are applied to the inputs D and C of a bistable circuit of type D, 101, which delivers at its output Q a signal applied with the signal CK to the inputs of a NOT OR gate 102 which delivers an inverted clock signal $\overline{H}$. An inverter 103 connected to the output of the gate 102 delivers the clock signal H applied to the input H of the addressing unit. The output of the bistable circuit 101 is also connected to the input E of the addressing unit. The control unit further comprises an input connected to earth and an input connected to the supply voltage of the logic circuits (for example $\mp 5$ V) not shown on the drawing.

The control unit further comprises control inputs for controlling internal resources of the control unit, input and output post boxes as indicated hereinafter; these inputs are the input I (A/B) for selecting the resources relating to the concerned face by an input or output operation and an input R/W which is employed for establishing the direction of the transfer required by the input-output operation; for example, if the signal R/W is at low level, the operation will be a writing operation in an input post box for the data present on the multiple connection B-BUS, and if the signal R/W is at high level, the operation will be a reading operation and the contents of one of the output post boxes will be transferred in the multiple connection B-BUS.

The control unit further comprises two selection inputs CS1 and CS2 which, when they are both at low level, "select" the box for effecting a data input or output operation through the multiple connection B-BUS and permit the starting of this operation. These two inputs permit the addition to the control unit of other resources, which are external in the case where the resources internal with respect to the control unit would be insufficient, or the putting in parallel of a plurality of analogous control units.

The control unit comprises outputs which are an output O (A/B) directly connected to the output A/B of the addressing unit 100, two outputs OBE respectively related to the faces A and B which deliver the state signals of the input post boxes of the control unit, an output $\overline{LL}$ which furnishes a signal which, at the active level, authorizes the production of external control signals, and an output $\overline{CSE}$, active at low level, which indicates where there must be read, as the case may be, the data binary elements: in the microprogram memory (a part of each micro-instruction comprising a data word), or in the input post boxes, resources which are internal with respect to the control unit. The combinations of the different input signals and the interpretation thereof for obtaining different output signals of the control unit, are given hereinafter in connection with a precise description of the control unit structure.

Apart from the addressing unit 100, the control unit comprises principally a multiplexer 110 receiving, on one hand, 4 indicators for each face and, on the other hand, the signal A/B for selecting the indicators relating to one or the other of the faces A or B and two selection signals $T_0$ and $T_1$ from an instruction register 120, the different combinations of which authorize the transfer of one or the other of the indicators at the output of the multiplexer, this output being connected to the test input T of the addressing unit 100 through an exclusive OR gate 111. These four indicators are, in respect of each face, an indicator coming from the exterior through the input test of the control unit, an indicator having a constant value 0 through the "earth" input of the control unit, an indicator related to the state of the input post box (respectively 130A and 130B for the input post boxes relating to the faces A and B), and an indicator related to the state of up-down counter (respectively 140A and 140B for the faces A and B). Thus the micro-instructions recorded in the memory and transferred to the control unit are capable of depending on conditions such as the state of the up-down counter (whether the latter be saturated or unsaturated), the state of an input post box (whether the latter has or does not have data) or the value of a test signal. For the micro-instructions which depend on no condition, the chosen indicator will be the constant value 0. The control unit further comprises two output post boxes respectively relating to the faces A and B to be coupled, 150A and 150B.

The multiple data output SDO of the addressing device is connected to the multiple inputs of the up-down counters 140A and 140B, for initiating these counters if need be, and to the output post boxes 150A and 150B for the transfer of data to the exterior, the data outputs of these post boxes being connecting to the multiple connection B-BUS.

The input post boxes 130A and 130B receive data through the multiple connection B-BUS and transfer them to the multiple connection P-BUS, when such a transfer is controlled thereof. The counters and the input and output post boxes have inputs Z, for their resetting to zero, connected to the input RAZ of the device. For the reading and writing controls respectively in the output post boxes 150A and 150B and the input post boxes 130A and 130B, the control unit comprises a control logic circuit 160 having four inputs connected to the inputs I (A/B), R/W, CS1 and CS2 of the control unit. This circuit having four outputs respectively connected to the reading control inputs R of the output post boxes 150A and 150B and to the writing control inputs W of the input post boxes 130A and 130B.

Figures 3, 4:
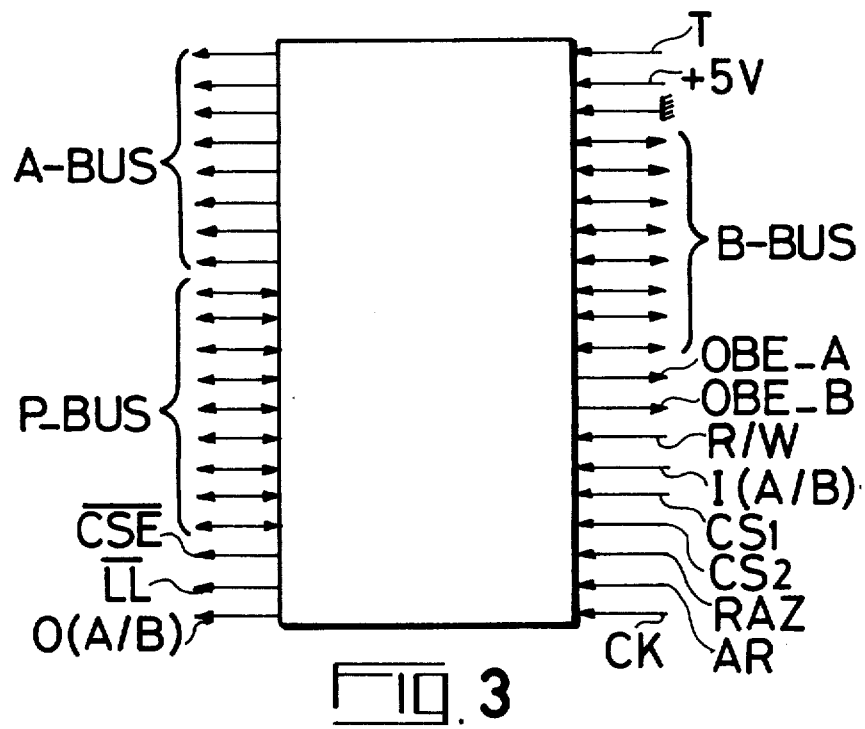
FIG. 3 represents the form that such a control unit can have when integrated in a box having forty pins.
FIG. 4 is an explanatory diagram.

For the programming of the control unit, the memory must contain micro-instructions of the type represented in FIG. 4. Each micro-instruction comprises a code word I and a data word II. The code word I is represented by way of example as comprising 9 binary elements distributed in 6 fields. During the whole of the clock signal cycle CK of the control unit, the control unit searches a micro-instruction in the memory. This search is effected in two stages and takes into account the decomposition of each micro-instruction into two parts.

Figure 5:
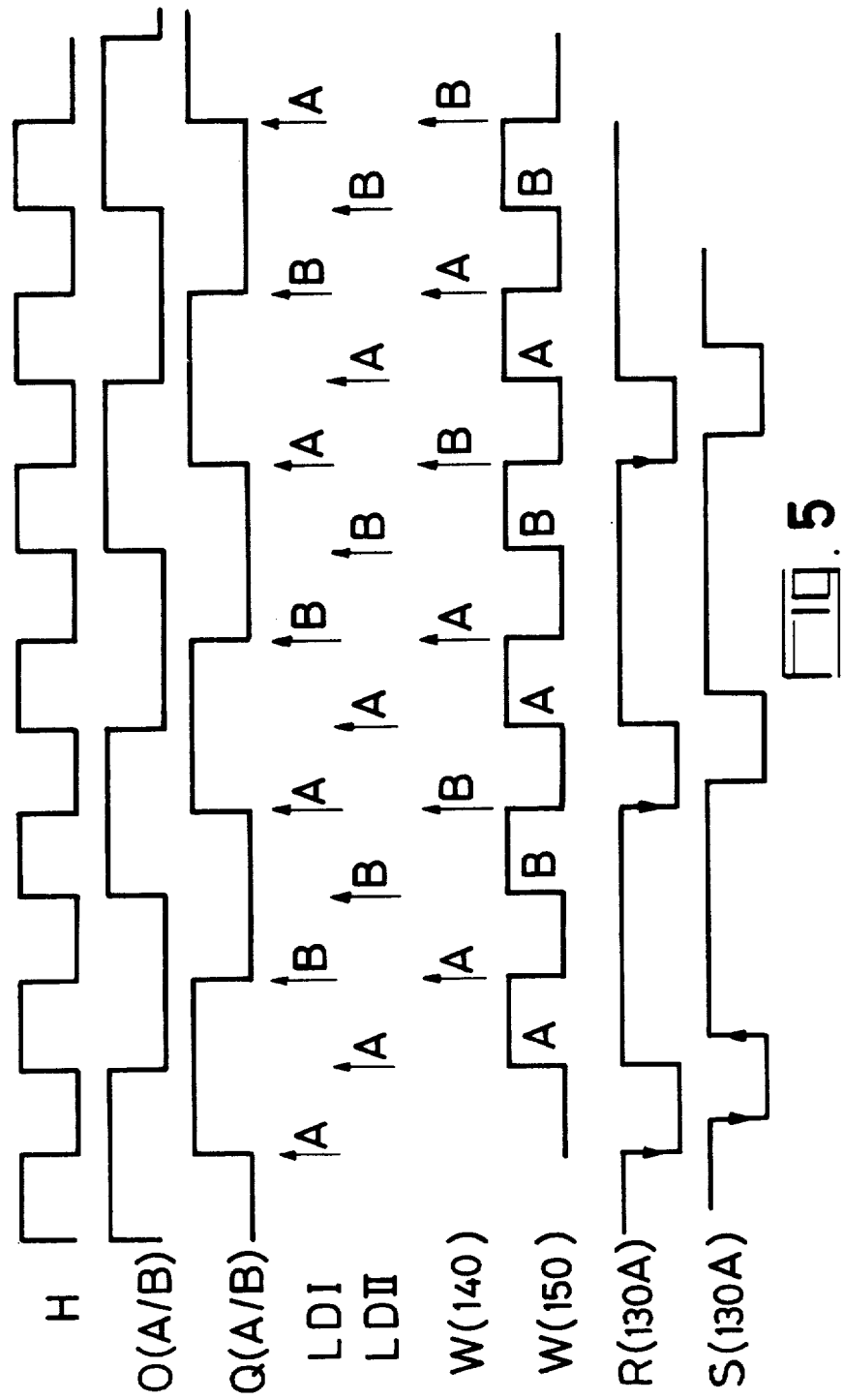
FIG. 5 is a timing diagram of the principal operational stages.

FIG. 5 represents a timing diagram of the different control signals of the device. On the leading edges of $\overline{H}$, signal LDI represented in FIG. 5, the code word transferred to the inputs P-BUS is stored in parts, in the instruction register 120, (fields INV and FT represented by the binary elements $P_1$, $P_2$ and $P_3$), in a second instruction register 125 (type field represented by the binary elements $P_5$, $P_6$ and $P_7$), applied to a bistable circuit 126 (fields IEX represented by the binary element $P_4$), and lastly applied to the inputs R and W of the addressing device (fields W and R of the micro-instruction represented by the binary elements $P_0$ and $P_8$). The bistable circuit 126 also receives the complemented clock signal $\overline{H}$ from the gate 102. The field IEX received by this bistable circuit serves to direct the control unit during the second stage LDII (which consists of taking into account a data word) by indicating the origin of this data. If IEX=1, the data read by the control unit is the argument contained in the data word of the micro-instruction and if IEX=0, the data is read in an input post box, this data being in both cases transferred, through the lines $P_0$ to $P_7$ of the multiple connection P-BUS, to the input EDO of the addressing unit. For this purpose, the output of the bistable circuit 126 is connected to an input of a NAND gate 127 the other input of which receives the clock signal H, this gate delivering a signal at the output $\overline{CSE}$ of the control unit which, if it is at low level (active) allows the transfer of the argument of the data word through the lines P-BUS. The output signal of this bistable circuit 126 is also applied to a logic circuit 128 which also receives the clock signal CK, the clock signal H and the signal O(A/B) and which delivers, when the output signal of the bistable circuit 126 is at high level, one or the other of the two reading control signals depending on the face concerned by the transfer of data applied to the reading inputs R of the two input post boxes 130A and 130B for the transfer of its contents through the lines P-BUS.

Simultaneously, a high level at the output $\overline{\text{CSE}}$ of the control unit indicates that the exterior must not disturb this transfer.

The multiple line P-BUS is therefore employed twice during each cycle; one for loading the instruction registers 120, 125, the bistable circuit 126 and bringing the values to the inputs W and R of the addressing unit, and a second time for transferring a data to this addressing unit through the data input EDO. The field INV, brought by the line $P_3$ to the instruction register 120, is a binary element which is applied, at the rhythm of the signal $\overline{H}$ applied to the control input of this instruction register, to the second input of the exclusive OR gate 111, the output of which is connected to the test input T of the addressing unit. This field permits the inversion of the test and in this way increases flexibility in the programming of the control unit. The field FT is transferred through the instruction register 120 to the selection inputs $T_0$ and $T_1$ of the multiplexer at the rhythm $\overline{H}$ for the selection of one of the indicators.

The instruction register 125 receives in addition to the type field of the code word, the signal O(A/B) indicating to which face the code word relates and the clock signal $\overline{H}$. The instruction registers 120 and 125, and the bistable circuit 126 are loaded on the leading edges of the signal $\overline{H}$. The register 125 furnished the corresponding binary elements to a transcoder 170 which also receives the output signal of the bistable circuit 126 and the signals Q(A/B) and $\overline{\text{Q(A/B)}}$ which are offset by a semi-clock period with respect to the signal O(A/B) as shown in FIG. 5. The latter signals are applied to the validation inputs of the counters 140A and 140B.

The type field of the code word (refer again to FIG. 4) delivered to the transcoder determines the type kind of the micro-instruction and determines together:

the address computing mode to be employed by the addressing unit during the address computing cycle of the following micro-instruction, that is to say the simple mode in which, according to the result of the test, the address is given by the contents of a branch register on the contents, increased by one unit, of a sequence register, or the indexed mode in which according to the result of the test, the contents of the input post box transferred to the input EDO and the contents of one of the branch or sequence registers are added;

an implicit control resulting in an incremental change in the counter 140A and 140B relating to the face concerned, if applicable;

the choice of the destination of the value passing through the lines P-BUS during the second stage, this destination being, for example, a branch register of the addressing unit, this value being then interpreted as an address if it is loaded in a branch register or as an index if it is transferred to the indexing input of the addressing unit, which could also be a counter (140A or 140B) to which this value will be delivered by the data ouput lines SDO of the addressing unit or an output post box (150A or 150B) which will receive it also through the output SDO and will transfer through to the bilateral connection B-BUS, the control unit then operating as a "slave" with respect to a central digital system or an exterior register supplied directly by the memory for emitting control signals.

By varying in this way the type field in association with two possible values of the field IEX, the type field having in the given example a length of 3 binary elements, it is possible to obtain 16 classes of micro-instructions which may be distinguished by taking into account, on one hand, the source of the data (the exterior EXT or an input post box 130 (A or B), on the other hand, the destination of the data, Dest, (the counter 140 (A or B), the first or the second branch register of the addressing unit (1 Reg BR or 2 Reg BR), the output post box 150 (A or B), an exterior register (Reg Ext) or the indexation input INDEX of the addressing device) and lastly by taking into account the incrementation control, IN, of the counter. These 16 types of micro-instructions are resumed in the table of FIG. 6 in which there have been indicated, for each type of micro-instructions, the numbers of the validated outputs of the transcoder 170. The output 1 validates the writing W of the data in the output post box 150A through an AND gate 171 which also receives the clock signal H. The output 2 validates the writing W in the output post box 150B through an AND gate 172 which also receives the clock signal H.

The validation of these outputs results, on one hand, from the code of the type field, and, on the other hand, from the clock signal, the writing in the output post boxes being effected during the first stages of the clock signal as indicated by the signal W (150) of the timing diagram of FIG. 5.

The output 3 validates the incrementation of the counters 140A and 140B by a NAND gate 173 which also receives the clock signal H. The output 4 validates the transfer of data in the counters 140A and 140B respectively through two NAND gates having 3 inputs, 174 and 175 also receiving the clock signal H and respectively the signal H and respectively the signal $\overline{\text{Q(A/B)}}$ and Q(A/B). These signals determine the instants when the writing W (140) is effected in the counters 140A and 140B as shown in the timing diagram of FIG. 5. The output 5 of the transcoder 170 validates the input L of the addressing unit 100 through a NAND gate 176 which also receives the clock signal CK. This input allows the transfer of data in a branch register of the addressing unit, the choice between the first and the second register being controlled by the output 6 of the transcoder connected to the input B of the addressing unit. The output 7 of the transcoder is connected to the input X of this same addressing unit and the validation thereof corresponds to an indexed addressing. This validation is obtained, from the type field, for the indication of the destination (indexxing input of the addressing device), and the field IEX. The output 8 of the transcoder is connected to the output $\overline{\text{LL}}$ of the control unit. This output is validated when the data transfer occurs toward the exterior resources.

There have also been represented in the timing diagram of FIG. 5 the instants when the code word of the micro-instruction is loaded in the instruction registers 120, 125 and the bistable circuit 126 and taken into account by the inputs R and W of the addressing unit in respect of each face A and B, and the instants when the data word is taken into account by the addressing unit. The signal R (130) (represented solely for the face A corresponds to the instants when the data word is possibly extracted from an input post box (trailing edges of the signal) and the state signal S (130A) represents the test signal for the state of the same input post box applied to the input of the multiplixer of the indicators 110. Analogous signals may be obtained with the input post box of the face B (always in as much as these input post boxes are employed).

FIG. 3 shows the exterior form that such a control unit integrated into a forty-pin box can have. It has been supposed that an address of a micro-instruction delivered to the control memory was coded on 8 binary elements, A-BUS having 8 conductors, that the connection P-BUS through which there are transferred the code words and the data words of the micro-instructions comprised 9 conductors as shown in the diagram of FIG. 2, and that the bidirectional connection B-BUS between the control unit and the central system also comprised 8 conductors. The other inputs of the control element are also to be found, namely the test input T, the selection inputs R/W, I(A/B), CS1, CS2, the inputs RAZ, AR, CK, +5 V and Earth and the outputs $\overline{CSE}$, $\overline{LL}$, O(A/B), OBE.A and OBE.B.

This form is particularly easy to handle and the main circuits required for a coupling are integrated within the same box.

The invention is not limited to the embodiment described and illustrated. In particular, the circuits employed and the interconnections thereof have been described by way of a non-limitative example. They may be interconnected in a different manner provided that the essential features of the invention are preserved : by way of example, instruction registers directly connected to the connection P-BUS have been described. It is possible to transmit both the code word as well as the data word through the input EDO and the addressing unit, the fields of the code word not used directly by the addressing unit being available on the multiple output connection SDO to which there may be connected the instruction registers for controlling the internal resources.

What is claimed is:

1. A microprogrammable control unit for an interface circuit adapted to control two systems acting simultaneously according to two stored independent sequences of micro-instructions, a store for storing said sequences or micro-instructions, said microinstructions comprising code words divided in several control fields to direct the operation of said control unit, said control unit having an instruction input bus line and an address bus output line to connect to said store, a data bus line, control inputs, test input and timing input, said control unit comprising:

an addressing unit having an instruction input, control inputs, test input, timing input coupled to said timing input of said control unit, address output connected to said address bus output line, and a multiple data output, said addressing unit being adapted to deliver to said store, at a fixed clock rate determined by timing signals applied to said timing input of said addressing unit, instruction addresses corresponding alternately to microinstructions in one and the other sequence;

instruction register each having multiple inputs connected to said instruction input bus line, and multiple output coupled to said control inputs of said addressing unit;

sources including two input registers, two output registers and two up and down counters, said input registers having control inputs, state outputs, multiple data inputs connected to said data bus line and multiple outputs connected to said instruction bus line, said output registers having control inputs, multiple data inputs connected to said multiple data output of said addressing unit, and said counters having state outputs, multiple data input also connected to said multiple data output of said addressing unit and control outputs, each of said sources having timing inputs coupled to outputs of a logic circuit having an input coupled to said timing input, said logic circuit selectively activating said sources responsive to said timing input for the coordination of data and instruction flow;

a multiplexer having inputs coupled to said state outputs and an input connected to said test input of said control unit and having control inputs coupled to outputs of an instruction register, said multiplexer having an output coupled to said test input of said addressing unit.

2. A microprogrammable control unit as claimed in claim 1, wherein said code word includes a type field corresponding to a kind of micro-instruction, said code word being applied to one of said instruction registers, said control unit further comprising a transcoder coupled to said instruction register receiving said type field, said transcoder being connected to said control inputs of said addressing unit and arranged to deliver, as a function of said type field, control signals for the writing of data delivered at said multiple data output of said addressing unit either in one of said output registers, or in one of said counters, and in said addressing unit itself.

3. A microprogrammable control unit as claimed in claim 2, wherein a selection field in said code word selects the data to deliver at said multiple data output of said addressing unit from said input registers or from outside said control unit.

4. A microprogrammable control unit as claimed in claim 3, wherein said output of said multiplexer is connected to said test input of said addressing unit via a logic circuit controlled by a field of one element in said code word having one of two states, said element being adapted to invert signal present on said output of said multiplexer for one of its two states.

5. A microprogrammable control unit as claimed in claim 4, wherein said multiplexer has a supplementary input wherein a signal having a constant value is selected with said selection field for particular unconditional micro-instructions.

6. A microprogrammable control unit as claimed in claim 5, wherein said control inputs are arranged to receive control signals governing transfers of data between said control unit and outside said control unit, said transfers being the reading of data in said output registers and the writing of data in said input registers.

7. A microprogrammable control unit as claimed in claim 6, having an integrated circuit structure.

* * * * *